US012787074B2

(12) United States Patent
Raccah et al.

(10) Patent No.: US 12,787,074 B2
(45) Date of Patent: Nov. 3, 2026

(54) AUTOMATIC DEVICE PAIRING USING A DOCKING STATION

(71) Applicant: Midland Radio Corporation, Kansas City, MO (US)

(72) Inventors: Guy Raccah, Kowloon (HK); Ralph Hollis, Overland Park, KS (US); Chuen Tak Lawrence Koo, Happy Valley (HK)

(73) Assignee: Midland Radio Corporation, Kansas City, MO (US)

( * ) Notice: Subject to any disclaimer, the term of this patent is extended or adjusted under 35 U.S.C. 154(b) by 324 days.

(21) Appl. No.: 18/603,299

(22) Filed: Mar. 13, 2024

(65) Prior Publication Data

US 2025/0294624 A1 Sep. 18, 2025

(51) Int. Cl.
*H04W 76/10* (2018.01)
*G06F 1/16* (2006.01)

(52) U.S. Cl.
CPC .......... *H04W 76/10* (2018.01); *G06F 1/1632* (2013.01)

(58) Field of Classification Search
CPC ............................ H04W 76/10; G06F 1/1632
See application file for complete search history.

(56) References Cited

U.S. PATENT DOCUMENTS 6,978,163 B2 * 12/2005 Dyer ...................... A45C 11/00 455/550.1
7,822,983 B2 * 10/2010 Aull .................... H04L 63/0853 713/172
2004/0198425 A1 * 10/2004 Mellone .............. H04M 1/6066 455/574
2006/0143455 A1 * 6/2006 Gitzinger ............ H04M 1/6066 713/170
2008/0269927 A1 * 10/2008 Szolyga ................ G06F 1/1632 700/94
2013/0297844 A1 * 11/2013 Rosenberg ............ G06F 1/1632 710/303
2018/0070407 A1 * 3/2018 Ohhira .................. H04W 12/06
2023/0293009 A1 * 9/2023 Barreras .............. A61B 5/0004 600/365

* cited by examiner

*Primary Examiner* — Jeanette J Parker
*Assistant Examiner* — John Caleb Lawrence
(74) *Attorney, Agent, or Firm* — AVEK IP, LLC

(57) ABSTRACT

This disclosure provides methods, components, devices, and systems for establishing wireless device connectivity between devices. Some aspects more specifically relate to auto-pairing devices to establish a wireless communication connection between devices using a docking station. These devices include a headset, a push-to-talk device, and a two-way radio. Upon docking the devices to the docking station, an auto-pairing process is initiated to establish a wireless communication connection between the devices. The docking station can exchange device information associated with the headset and the push-to-talk device and transmit that information to the two-way radio. Upon receiving the device information, the two-way radio and other devices can establish wireless communication connections. As a result, the devices are automatically paired with each other when the devices are docked to the docking station.

20 Claims, 5 Drawing Sheets

AUTOMATIC DEVICE PAIRING USING A DOCKING STATION

TECHNICAL FIELD

This disclosure relates generally to wireless connectivity and, more specifically, to establishing wireless communication connections between devices docked on a docking station, allowing the docking station to serve as a connection bridge between docked devices.

BACKGROUND

Wireless connectivity techniques refer to the various methods and technologies used to establish wireless communication connections between devices. These techniques have evolved over the years and are widely used in a variety of applications, including Wireless Fidelity (Wi-Fi) networks, cellular communications, Bluetooth® wireless technology connections, radio frequency communications, Near Field Communication (NFC), and the like.

Devices, such as two-way radios (commonly referred to as “walkie-talkies”), are portable communication devices that allow two or more users to have real-time, two-way communication over short to moderate distances without the need for a centralized infrastructure or cellular network. These two-way radios and their associated accessories can utilize wireless connectivity techniques that provide additional features for the two-way radio.

SUMMARY

Introduced here are methods, components, devices, and systems for wireless device connectivity by auto-pairing the devices to establish a wireless communication connection between the devices using a docking station.

Embodiments of the present disclosure are directed to providing mechanisms, including methods and non-transitory computer storage mediums for establishing a wireless communication connection between devices using a docking station. The method includes detecting that a device is docked and communicatively coupled to a docking station. The method also includes determining that the device is a two-way radio and is docked to the docking station. In some implementations, the device transmits its device information to the docking station for the docking station to determine the type of device that is docked. The method also includes detecting a second device docked to the docking station and transmitting the device information associated with the second device to the two-way radio. The method further includes facilitating a wireless communication connection between the two-way radio and the second device by transmitting information between the devices during the connection process. In some implementations, the second device is a headset.

In some examples, the method includes detecting a third device docked and communicatively coupled to the docking station. The method also includes detecting the two-way radio is docked and communicatively coupled to the docking station and transmitting the device information associated with the third device to the two-way radio. The method further includes facilitating a second wireless communication connection between the two-way radio and the third device by transmitting information between the devices during the connection process. In some implementations, the third device is a push-to-talk (PTT) device.

In some examples, the a dongle communicatively coupled to the two-way radio and used provides wireless communication capabilities for the two-way radio and establishes wireless connections with other devices while docked to a docking station.

This summary is intended to introduce a selection of concepts in a simplified form that is further described in the detailed description section of this disclosure. The summary is not intended to identify key or essential features of the claimed subject matter, nor is it intended as an aid in determining the scope of the claimed subject matter. Additional objects, advantages, and novel features of the technology will be set forth in the following description and, in part, will become apparent to those skilled in the art upon examination of the disclosure or learned through practice of the technology.

BRIEF DESCRIPTION OF THE DRAWINGS

These and other features, aspects, and advantages of the embodiments of the disclosure will become better understood with regard to the following description, appended claims, and accompanying drawings where:

Figure 1:
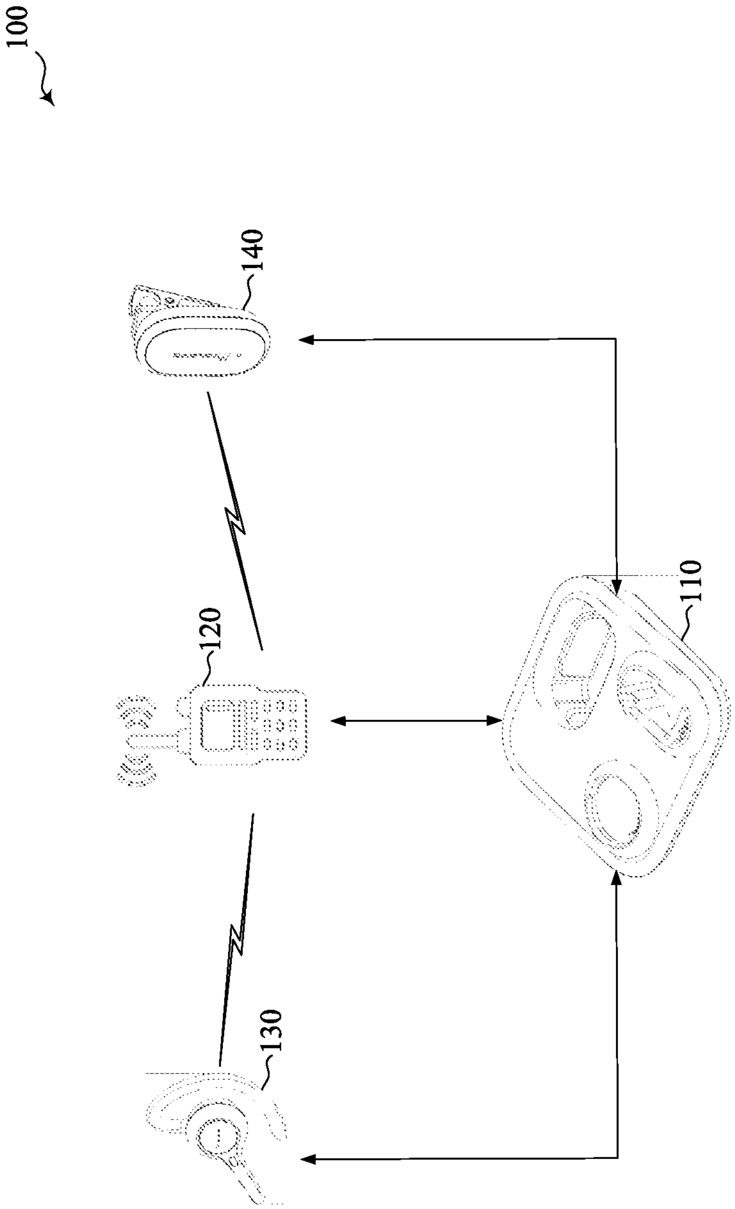
FIG. 1 illustrates a diagram of a radio communication environment for establishing wireless communication connections between devices docked to a docking station, in accordance with embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

This disclosure relates generally to wireless connectivity and, more specifically, to establishing wireless communication connections between devices docked to a docking station, allowing the docking station to serve as a connection bridge between docked devices. The following description is directed to some particular examples for the purpose of describing innovative aspects of this disclosure. However, a person having ordinary skill in the art will readily recognize that the teachings herein can be applied in a multitude of different ways.

Overview

Two-way radios provide portable communication, allowing users to transmit and receive audio messages over short to moderate distances using radio waves. They are widely used in various industries due to their simplicity, reliability, and real-time communication capabilities. Typically, two-way radios operate on specific channels, or radio frequencies, allocated by regulatory authorities. Often, two-way radios are configurable to operate across multiple channels or frequency bands, allowing users to switch between different communication groups or frequencies.

Various industries rely on two-way radios for their communication. These industries include public safety and emergency services, construction and manufacturing, hospitality and retail, transportation and logistics, security services, manufacturing and industrial services, and the like. Due to the wide range of industries and people that utilize two-way radios, there exists a wide range of accessories and peripherals associated with two-way radios that enhance their functionality and usability and may better assist users in their use of a two-way radio.

These accessories include, but are not limited to, headsets and earpieces, remote speaker microphones, batteries and chargers, antennas, Bluetooth modules, external microphones and speakers, signal boosters, repeaters, Global Positioning System (GPS) modules, and the like. These accessories can be valuable for customizing two-way radio setups to meet specific communication needs, improve user comfort and safety, and ensure optimal performance in various industries and applications.

As an example, headset and earpieces allow users to listen to transmissions received by a two-way radio through the headset or earpiece. Such devices can have either a wireless or wired connection to a two-way radio to facilitate audio transmission to the device. Commonly, wireless devices establish connections with two-way radios through the use of Bluetooth technology. Bluetooth technology is a wireless communication standard that allows electronic devices to connect and exchange data over short distances using radio waves.

Limitations on wireless connectivity between devices and two-way radios remain however, as establishing a wireless connection between the devices and a two-way radio can be difficult as connections may require a user enter a PIN or passkey, or devices may not always be compatible with each other due to differences in Bluetooth versions or profiles. At other times, devices may not appear in the list of available devices when trying to pair. This can occur if the Bluetooth settings are not enabled on one of the devices or if one of the devices is not in discoverable mode. To add to the difficulties, some devices may have a limited interface or no interface at all that can provide a user with the detailed information required for establishing a wireless communication connection with another device or accessory.

Various aspects of disclosure improve the existing technologies described herein, as well as others, by providing methods, components, systems, and devices that support the automatic establishment of wireless communication connections while docked to a docking station. Some aspects particularly relate to establishing a wireless communication connection between devices using a docking station. The devices can include a headset, a push-to-talk device, and a two-way radio. Upon docking the devices to the docking station, an auto-pairing process is initiated to establish the wireless communication connection between the devices. The docking station can verify the device information associated with the two-way radio and push-to-talk device to determine whether a wireless communication connection has already been established with the headset. If no prior connection has occurred, the docking station can transmit the device information associated with the headset and the push-to-talk device to the two-way radio to initiate the connection. Upon receiving the device information, the wireless communication connections can be established. As a result, the devices are automatically paired with each other when the devices are docked to the docking station.

Particular aspects of the subject matter described in this disclosure can be implemented to realize one or more of the following potential advantages. The present disclosure aims to provide device connectivity across multiple devices through the use of a docking station by implementing mechanisms that ensure wireless communication connections between the devices. By providing auto-pairing using a docking station, the devices incorporate increased security by ensuring unauthorized devices cannot easily connect to the devices. Additionally, the auto-pairing mechanism provides greater ease of use, allowing users to switch between devices without having to manually go through the pairing process each time. By integrating battery charging and auto-pairing into the docking station, aspects of the disclosure also improve user experience by reducing the difficulty associated with setting up and connecting devices, as well as ensuring these devices remain charged while in use together.

Example Radio Communication Environment

FIG. 1 shows a block diagram of an example radio communication environment 100 suitable for use in implementing embodiments of the disclosure. The radio communication environment 100 is configured to facilitate the establishment of wireless communication connections between the devices associated with each other. According to some aspects, the radio communication environment 100 can include a docking station 110, a two-way radio 120, a headset 130, and a push-to-talk (PTT) device 140. As discussed, the radio communication environment 100 uses the docking station 110 to detect devices that have been docked. Once detected, the docking station 110 can facilitate the establishment of a wireless communication connection between the devices.

FIG. 1 represents various different types of devices and accessories that can be wirelessly coupled and paired together. These devices include, but are not limited to, earpieces, Bluetooth dongles, external speakers, GPS modules, Bluetooth adapters, antenna boosters, external microphones, and the like. The communication connection between the devices can vary based on the type of connection. For example, Bluetooth range, also known as Bluetooth coverage or distance, can vary based on the version of Bluetooth that is being used as well as the classification given to the devices. For instance, a Class 1 device can have a range up to 100 meters, while a Class 2 device can have a range of up to 10 meters. Additionally, the docking station 110 can include a variety of ports and interfaces to connect the devices, such as the two-way radio 120, the headset 130, and the PTT device 140 to the docking station.

The docking station 110 is a component of the radio communication environment 100 configured to provide power delivery and charging to devices that are docked as well as to facilitate the establishment of a wireless communication connection between the docked devices. The docking station 110 can also include a microcontroller unit (MCU) that can serve as a hub or interface for connecting the devices. The MCU can be configured to control and manage operations on the docking station 110 as well as provide various other functionalities of the docking station 110.

In some implementations, the MCU can include a central processing unit (CPU), memory, peripheral interface controllers, and power management units. Security and encryption modules, firmware and software, communication interfaces, and temperature and voltage sensors. An example MCU, or computing device, and its various components are described in greater detail in FIG. 5.

The docking station 110 is further configured to handle data transfers between the docked and connected devices. The data transfers can include wireless device information associated with the devices so as to facilitate the establishment of the wireless communication connection. For example, the devices may utilize Bluetooth to establish wireless connections between each other. The docking station 110 can facilitate the transfer of their respective Bluetooth MAC Address to each other. A Bluetooth MAC address is a unique identifier assigned to each Bluetooth-enabled device. It can provide various functionalities such as device identification, addressing and routing, pairing and authentication, security, connection management, network scanning, and device inventory and management.

As an example, a wireless communication connection process between devices is described. The initiating device (often referred to as the "master" or "primary") initiates the connection process by sending out inquiry messages to discover nearby Bluetooth devices (often referred to as "slaves" or "secondary") within its range.

The primary device performs an "inquiry scan" to discover available secondary devices. During this process, it listens for inquiry responses from nearby devices. The secondary devices, upon receiving the inquiry message, respond with "page scans" to indicate their presence. When the primary device identifies a potential secondary device, it collects information about the device, including its Bluetooth address (MAC address) and device name (friendly name). The primary device sends a connection request to the identified secondary device, indicating its intention to establish a Bluetooth connection. The secondary device receives the connection request and sends a response to the primary device, acknowledging the connection request and indicating its willingness to establish the connection.

If the Bluetooth devices have not been paired before or require additional security, they may exchange a Personal Identification Number (PIN) or passkey. In some instances, the devices may require authentication and authorization steps to ensure that only authorized devices can connect. This can involve the user confirming the connection on one or both devices. Once the authentication and authorization steps (if needed) are completed, the primary and secondary devices establish a Bluetooth link, which includes the establishment of a secure and encrypted communication channel.

After the link is established, the devices may perform service discovery to identify the Bluetooth profiles and services supported by each other. This helps determine what functionalities and capabilities can be utilized during the connection. With the successful completion of the handshake process, the Bluetooth connection is established. The devices can now communicate with each other according to the supported Bluetooth profiles and services. Following the connection setup, the devices can exchange data, audio, or commands, depending on the intended use case and the Bluetooth profiles in use.

The two-way radio 120 is a component of the radio communication environment 100 configured as a portable communication device that enables two or more users to communicate wirelessly over short distances. The two-way radio 120 can include an antenna responsible for transmitting and receiving radio signals, a transmitter for converting an audio signal from the microphone into radio waves over the airwaves, a receiver for receiving incoming radio signals, a microphone, a speaker, control buttons and interface, a battery, and a charging port. In some implementations, the two-way radio 120 is further capable of establishing a wireless communication connection between itself and various other devices. For example, the two-way radio 120 can have Bluetooth functionalities built into the device, allowing the two-way radio 120 to setup a Bluetooth connection with another device.

In some implementations, the two-way radio 120 includes a port to allow for attachments to be communicatively coupled to the two-way radio 120. In some examples, the two-way radio 120 can include a dongle attachment that provides Bluetooth functionality, also commonly referred to as a "Bluetooth adapter" or "Bluetooth module." This type of attachment allows the two-way radio 120 to connect wirelessly to other Bluetooth-enabled devices and accessories, expanding its versatility and capabilities.

In some implementations, the two-way radio 120 includes a Bluetooth module. The Bluetooth module can be integrated into the two-way radio 120 and allows wireless communication with other Bluetooth devices. It enables the headset to pair with other Bluetooth-equipped devices (e.g., the headset 130, the PTT device 140). In some implementations, the Bluetooth module is configured for multipoint connectivity. Multipoint connectivity is a feature in Bluetooth technology that allows a Bluetooth device to simultaneously connect and interact with multiple other Bluetooth devices. This feature allows a user to use a single Bluetooth device, like a headset or speaker, with multiple secondary devices, such as a headset 130 and PTT device 140, without the need to repeatedly disconnect and reconnect devices. Essentially, with multipoint connectivity, the two-way radio 120 can establish and maintain connections with two or more source devices at the same time. These source devices can be other Bluetooth-enabled devices that send audio or data to the two-way radio 120.

The headset 130 is a component of the radio communication environment 100 configured to allow users to communicate over a two-way radio system via a wireless communication connection. The headset 130 is further configured to establish wireless communication connections with other devices associated with the radio communication environment 100. The headset 130 can include an earpiece or earcup with an integrated speaker for audio output and a microphone for voice input. In some implementations, the headset 130 can include a boom microphone that can be adjusted for optimal positioning close to the user's mouth for clear voice transmission. Depending on the design, the headset 130 can have an adjustable headband or an over-the-head design that allows users to wear it securely.

In some implementations, the headset 130 includes a Bluetooth module. The Bluetooth module can be integrated into the headset 130 and allows wireless communication with other Bluetooth devices. It enables the headset to pair with other Bluetooth-equipped devices (e.g., the two-way radio 120, the PTT device 140).

The PTT device 140 is a component of the radio communication environment 100 configured as a communication device that allows users to activate a speaking button of a device through a dedicated PTT button located on the PTT device 140. The PTT button, when activated, allows a user to transmit voice messages to one or more recipients once the PTT device 140 is paired with another device. The PTT device 140 can provide efficient and quick communication by providing an alternative talk activation button for the two-way radio 120.

In some implementations, the PTT device 140 includes Bluetooth Low Energy (BLE) functionality. BLE can operate in a half-duplex mode, allowing the PTT device 140 to take turns transmitting and receiving data to save power.

It is noted that FIG. 1 is intended to depict the major representative components of a radio communication environment 100. In some embodiments, however, individual components may have greater or lesser complexity than as represented in FIG. 1, components other than or in addition to those shown in FIG. 1 may be present, and the number, type, and configuration of such components may vary.

Example Use Case Sequence Diagram

Figure 2:
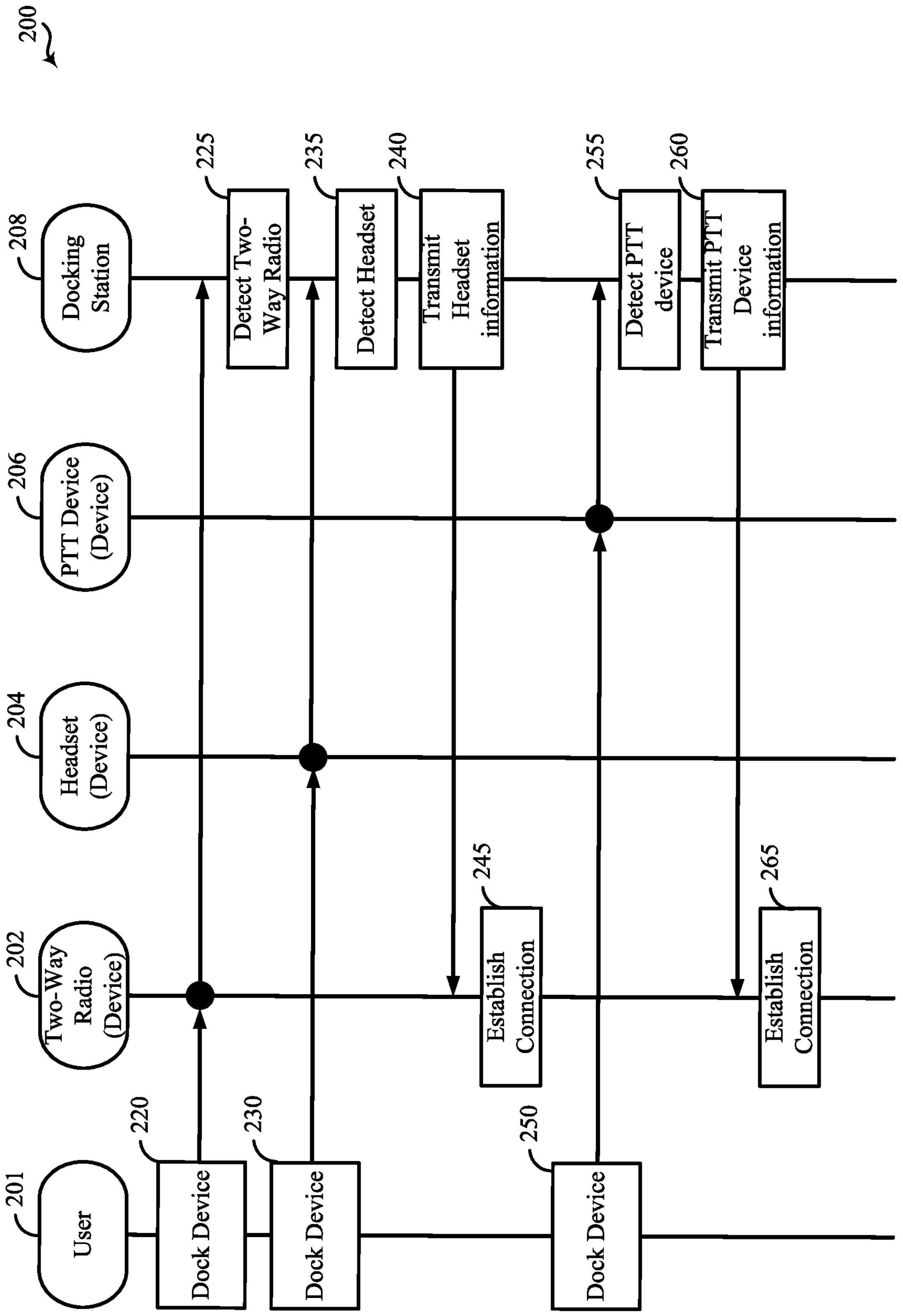
FIG. 2 illustrates a use case sequence diagram of a user establishing a wireless communication connection between devices by docking those devices to a docking station, in accordance with embodiments of the present disclosure.

FIG. 2 shows a sequence diagram 200 of an example use case scenario of a user 201 docking devices onto a docking station 208 to establish a wireless communication connection between the devices, in accordance with embodiments of the present disclosure. According to some aspects, the sequence diagram 200 represents a procedure that can occur to devices to allow them to exchange information and facilitate a wireless communication connection between the devices. The wireless communication connection allows them to communicate while in proximity to each other. Additionally, in some aspects, the sequence diagram 200 illustrates how multiple devices can be docked to establish a wireless communication connection between each device without the need for additional input. As shown, the sequence diagram 200 includes a user 201 performing a series of actions across multiple devices. These devices include a two-way radio 202, a headset 204, a PTT device 206, and a docking station 208. While only four devices (202, 204, 206, 208) are shown in FIG. 2, implementations of the present disclosure can include any number of devices capable of being docked to the docking station 208 and configurable to establish a wireless communication connection.

In some examples, at block 220, the user 201 docks the two-way radio 202 to the docking station 208. Docking the two-way radio 202 to the docking station 208 provides charging to the batteries associated with the two-way radio 202. Docking also communicatively couples the two-way radio 202 with the docking station 208. At block 225, the docking station 208 detects that a device has been docked. Upon detection, the docking station 208 can determine the type of device docked. As an example, the two-way radio 202 can have Bluetooth capabilities that can transmit information such as its device name, MAC address, device class, Bluetooth version, supported Bluetooth profiles, battery level, device status and connection state, manufacturer information, and firmware version to the docking station. The information provided by a device can vary depending on the device type, Bluetooth version, and services they support. This information can provide the docking station 208 with the type of device being docked and can also assist with the pairing and use of the device.

At block 230, the user 201 docks the headset 204 to the docking station 208. Similarly, docking the headset 204 to the docking station 208 provides charging to the batteries associated with the headset 204. Docking also communicatively couples the headset 204 with the docking station 208. At block 235, the docking station 208 detects that a second device has been docked. Upon detection, the docking station 208 can determine the type of device docked. The headset 204 can transmit its device information to the docking station 208 in the same, or similar, manner as the two-way radio 202.

Having detected that at least two devices have been docked and that one of the devices is the two-way radio 202, the docking station 208, at block 240, transmits the device information (e.g., the MAC address) of the headset 204 to the two-way radio 202. Upon receiving the device information, the two-way radio 202 can establish a wireless communication connection with the headset 204. In some examples, the wireless communication can be performed by pairing the two Bluetooth devices by exchanging a passkey or PIN. The docking station 208 can facilitate the transfer of information between the devices and can provide secure confirmation of the pairing request.

At block 250, the user 201 docks the PTT device 206 to the docking station 208. In the same, or similar, manner as the other devices, docking the PTT device 206 to the docking station 208 provides charging to the batteries associated with the PTT device 206. Docking also communicatively couples the PTT device 206 with the docking station 208. At block 255, the docking station 208 detects that a third device has been docked. Upon detection, the docking station 208 can determine the type of device docked. The PTT device 206 can transmit its device information to the docking station 208 in the same, or similar, manner as the two-way radio 202 and the headset 204.

Having detected that a third device has been docked, the docking station 208, at block 260, transmits the device information (e.g., the MAC address) of the PTT device 206 to the two-way radio 202. Upon receiving the device information, the two-way radio 202 can establish a wireless communication connection with the PTT device 206. In some examples, the wireless communication can be performed by pairing the two Bluetooth devices by exchanging a passkey or PIN. The docking station 208 can facilitate the transfer of information between the devices and can provide secure confirmation of the pairing request.

As such, the docking station 208 can facilitate the establishment of wireless communication connections between devices that are docked to the docking station 208. In this example, the docking station 208 facilitated the establishment of a wireless communication connection between the two-way radio 202 and the headset 204 as well as a wireless communication connection between the two-way radio 202 and the PTT device 206 by only requiring the user 201 dock the devices to the docking station 208.

Example Flow Diagrams

Figure 3:
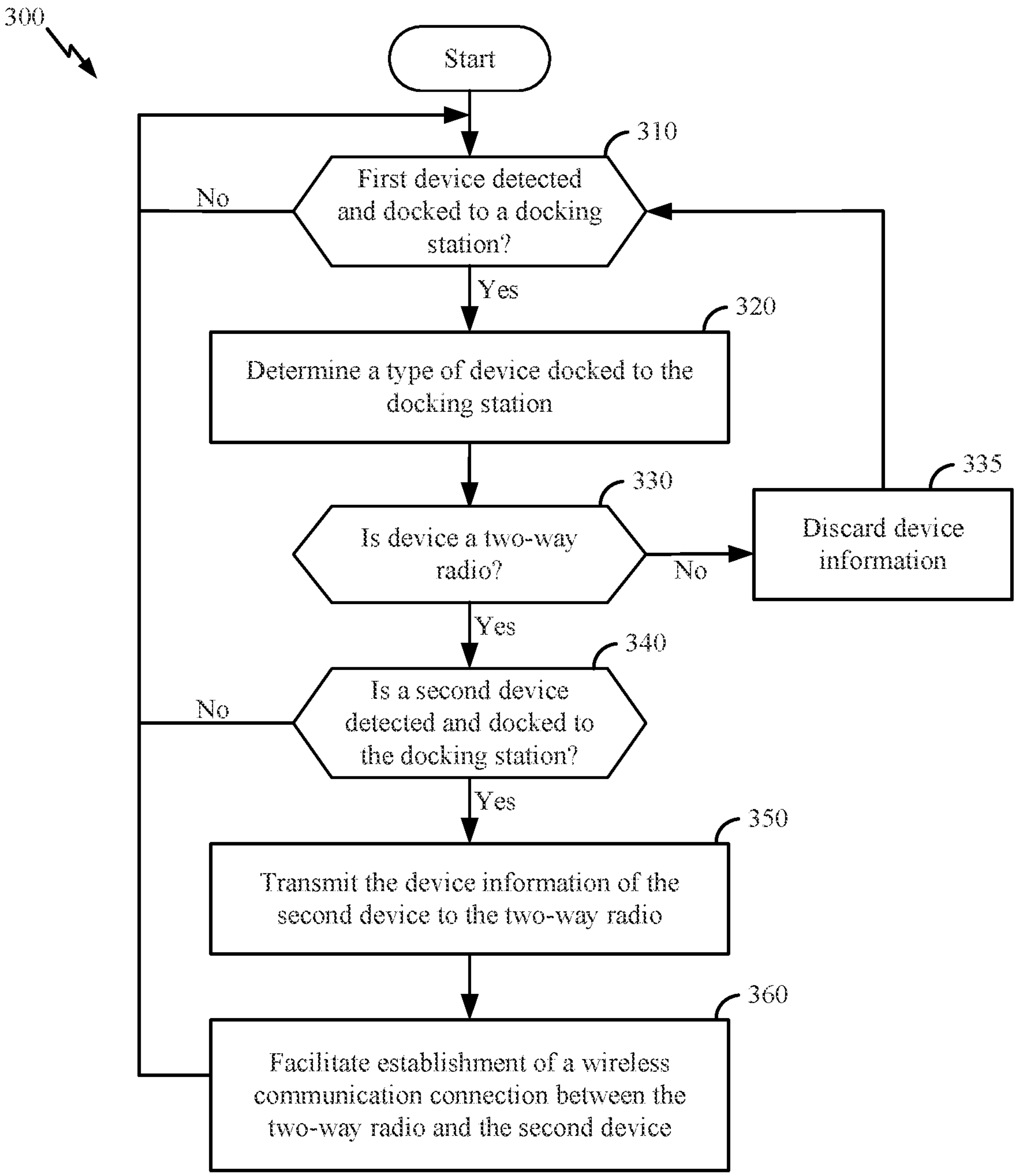
FIG. 3 illustrates a flow chart of facilitating a wireless communication connection between devices, in accordance with embodiments of the present disclosure.
Figure 4:
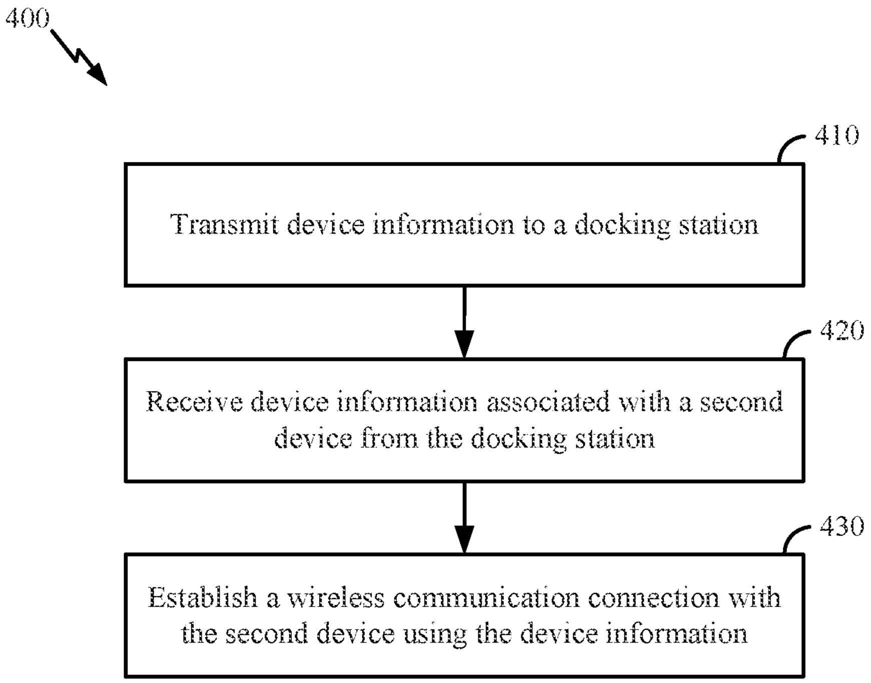
FIG. 4 illustrates a flow chart of establishing a wireless communication connection with another device using a docking station, in accordance with embodiments of the present disclosure.

With reference now to FIGS. 3 and 4, flow diagrams are provided illustrating various methods. Each block of the methods 300 and 400 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media.

FIG. 3 illustrates a method 300 of a series of acts in a method of establishing a wireless communication connection between devices docked to a docking station, in accordance with embodiments of the present disclosure. In one or more embodiments, the method 300 is performed in a digital medium environment that includes the radio communication environment 100. In some examples, the method 300 may be performed by a computing device such as the one of the computing device 500 described with reference to FIG. 5. The method 300 is intended to be illustrative of one or more methods in accordance with the present disclosure and is not intended to limit potential embodiments. Alternative embodiments can include additional, fewer, or different steps than those articulated in FIG. 3.

As illustrated in FIG. 3, the method 300 includes a block 310 that detects whether a first device is docked to a docking station. As described, the docking station can include various charging ports for connecting external devices. These charging ports allow the docking station to recharge a device's batteries as well as to communicatively couple the devices to the docking station. If no device has been docked, the docking station can continuously monitor for new devices being docked. However, if a device has been docked, the method 300 proceeds to block 320.

At block 320, the docking station determines a type of device that has been docked. As the device and the docking station are communicatively coupled while docked, the device can transmit its device information to the docking station. Once received, the docking station can analyze the device information to determine the type of device being docked as well as other pertinent information relating to the device. At block 330, the docking station determines whether the first device is a two-way radio.

In some examples, two-way radios act as the primary, or master, device for establishing a wireless communication connection between devices. The primary device can take a central role in establishing and managing the wireless communication connection, controlling the timing of communication, and ensuring synchronized data exchange between itself and one or more secondary devices. In some instances, the primary devices can initiate the connection and is responsible for maintaining the network (e.g., Bluetooth network). If the first device is not a two-way radio, the method 300 proceeds to block 335 and discards, or ignores, the device information until a two-way radio is docked. However, if a two-way radio is detected, the method 300 proceeds to block 340.

At block 340, the docking station detects whether a second device is detected and docked to the docking station. Similarly, as previously described, the docking station can include various charging ports for connecting external devices. These charging ports allow the docking station to recharge a device's batteries as well as to communicatively couple the devices to the docking station. If a second device has not been detected and docked, the docking station and method 300 can return to continuously monitor for new devices being docked. However, if a second device has been docked, the method 300 proceeds to block 350.

In some examples, upon docking, devices can transmit their device information to the docking station. In some other examples, the docking station can request device information from a device once docked. Upon receiving the device information, the docking station can analyze that information to determine the type of device being docked as well as other pertinent information relating to the device. At block 350, the docking station can transmit the device information of the second device to the two-way radio. The device information of the second device can be used to notify the two-way radio to initiate the establishment of a wireless communication connection between itself and the second device.

At block 360, the docking station facilitates the establishment of the wireless communication connection between the two-way radio and the second device by transmitting information between the devices while they set up the wireless communication connection. This information can include a connection request transmitted by the primary device, the response from the secondary device, PIN/passkey exchanges, as well as authentication and authorization information if required.

FIG. 4 illustrates a method 400 of a series of acts in a method of establishing a wireless communication connection between devices docked to a docking station, in accordance with embodiments of the present disclosure. In one or more embodiments, the method 400 is performed in a digital medium environment that includes the radio communication environment 100. In some examples, the method 300 may be performed by a computing device such as the one of the computing device 500 described with reference to FIG. 5. The method 400 is intended to be illustrative of one or more methods in accordance with the present disclosure and is not intended to limit potential embodiments. Alternative embodiments can include additional, fewer, or different steps than those articulated in FIG. 4.

As illustrated in FIG. 3, at block 410, a two-way radio, communicatively coupled with a docking station, transmits its device information to the docking station. As previously described, the device information can include the MAC address associated with the device, the device name, class of device, and supported wireless technology. For example, the two-way radio may support Bluetooth technology and may also support the Hands-Free Profile (HFP) and the Advanced Audio Distribution Profile (A2DP), indicating its ability to handle voice calls and audio streaming. The device information can also include a device status and connection state, manufacturer information, and battery level.

At block 420, the two-way radio receives device information from the docking station that is associated with a second device docked to the docking station. The device information can include the same, or similar, information the headset provided to the docking station. Based on that information, the two-way radio at block 430 can establish a wireless communication connection with the second device. Acting as the primary device, the two-way radio can initiate a connection request with the second device identified in the received device information. The second device can respond to the request by acknowledging the connection request and indicate its willingness to establish the connection. In some examples, if the devices have not been previously paired or require additional security, they can exchange a Personal Identification Number (PIN) or passkey. Additional information may also be exchanged to establish the wireless communication connection. The information being exchanged can be facilitated by the docking station as it provides a communication coupling with the devices.

Example Operating Environment

Figure 5:
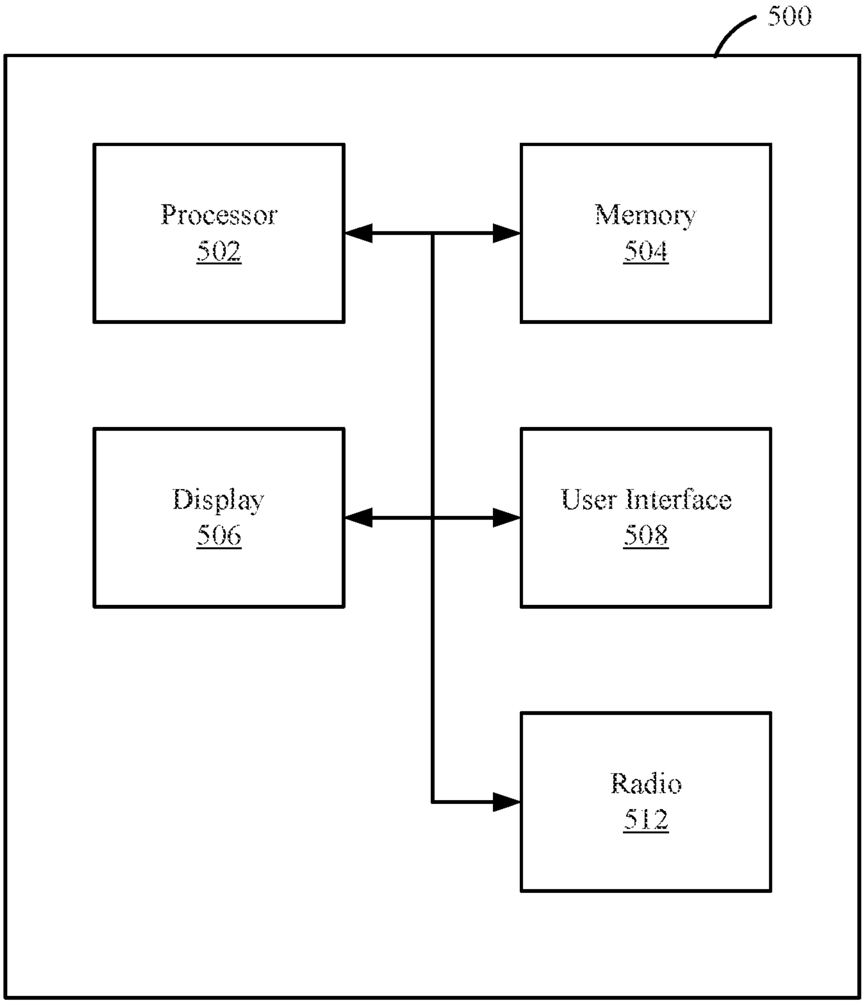
FIG. 5 illustrates a block diagram of an exemplary computing device, in accordance with embodiments of the present disclosure.

Having described an overview of embodiments of the present technology, an example operating environment in which embodiments of the present technology may be implemented is described in order to provide a general context for various aspects of the present technology. Referring now to FIG. 5, in particular, an exemplary operating environment for implementing embodiments of the present technology is shown and designated generally as computing device 500. Computing device 500 is but one example of a suitable computing environment and is not intended to suggest any limitation as to the scope of use or functionality of the technology. Neither should computing device 500 be interpreted as having any dependency or requirement relating to any one or combination of components illustrated.

The technology of the present disclosure may be described in the general context of computer code or machine-useable instructions, including computer-executable instructions such as program modules, being executed by a computer or other machines, such as a personal data assistant or other handheld devices. Generally, program modules, including routines, programs, objects, components, data structures, etc., refer to code that performs particular tasks or implement particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

FIG. 5 shows a block diagram of an example computing device 500 that facilitates the establishment of a wireless communication connection between devices docked to a docking station. In some examples, the computing device 500 is configured to perform the processes 300 and 400 described with reference to FIG. 3 and FIG. 4. The computing device 500 may include one or more chips, SoCs, chipsets, packages, components or devices that individually or collectively constitute or comprise a processing system. The processing system may interface with other components of the computing device 500, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the computing device 500 may transmit the information output from the chip. In such an example, the second interface may refer to an interface between the processing system of the chip and a reception component, such that the computing device 500 may receive information that is then passed to the processing system. In some such examples, the first interface may obtain information, such as from the transmission component, and the second interface may also output information, such as to the reception component.

The processing system of the computing device 500 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the computing device 500 can be configurable or configured for use in a docking station, such as the docking station 110 described with reference to FIG. 1. In some other examples, the computing device 500 can be a two-way radio that includes such a processing system and other components including multiple antennas. In some examples, the computing device 500 can be configurable or configured for use in a headset, such as the headset 130 described with reference to FIG. 1. In some other examples, the computing device 500 can be a headset that includes such a processing system and other components including multiple antennas.

The computing device 500 is capable of transmitting and receiving wireless communications in the form of, for example, wireless packets or data elements. For example, the computing device 500 can be configurable or configured to transmit and receive packets in the form of physical layer PPDUs and MPDUs conforming to one or more of the IEEE 802.11 family of wireless communication protocol standards. In some other examples, the computing device 500 can be configurable or configured to transmit and receive signals and communications conforming to one or more 3GPP specifications including those for 5G NR or 6G. In some other examples, the computing device 500 can be configurable or configured to transmit and receive signals and communications conforming to one or more Bluetooth specifications including Bluetooth 1.0-5.0, Bluetooth Low Energy, Bluetooth high-speed, and Bluetooth enhanced data rate.

In some examples, the computing device 500 also includes or can be coupled with one or more application processors which may be further coupled with one or more other memories. In some examples, the computing device 500 further includes at least one external network interface coupled with the processing system that enables communication with a core network or backhaul network that enables the computing device 500 to gain access to external networks including the Internet.

The computing device 500 includes a processor component 502, a memory component 504, and display component 506, a user interface component 508, and a radio component 512. Portions of one or more of the components 506, 508, and 512 may be implemented at least in part in hardware or firmware. In some examples, at least some of the components 506, 508, and 512 of the device 500 are implemented at least in part by a processor and as software stored in a memory. For example, portions of one or more of the display component 506, and the user interface component 508 can be implemented as non-transitory instructions (or "code") executable by the processor 502 to perform the functions or operations of the respective module.

In some implementations, the processor 502 may be a component of a processing system. A processing system may generally refer to a system or series of machines or components that receives inputs and processes the inputs to produce a set of outputs (which may be passed to other systems or components of, for example, the device 500). For example, a processing system of the device 500 may refer to a system including the various other components or subcomponents of the device 500, such as the processor, or a transceiver, or a communications manager, or other components or combinations of components of the device 500. The processing system of the device 500 may interface with other components of the device 500 and may process information received from other components (such as inputs or signals) or output information to other components. For example, a chip of the device 500 may include a processing system, a first interface to output information and a second interface to obtain information. In some implementations, the first interface may refer to an interface between the processing system of the chip and a transmitter, such that the device 500 may transmit information output from the chip. In some implementations, the second interface may refer to an interface between the processing system of the chip and a receiver, such that the device 500 may obtain information or signal inputs, and the information may be passed to the processing system. A person having ordinary skill in the art will readily recognize that the first interface also may obtain information or signal inputs, and the second interface also may output information or signal outputs.

The processor 502 is capable of, configured to, or operable to processes information received through the radio 512, and processes information to be output through the radio 512 for transmission through the wireless medium. The processor 502 may perform logical and arithmetic operations using program instructions stored within the memory 504. The instructions in the memory 504 may be executable (by the processor 502, for example) to implement the methods described herein. In some examples, the processor 502, together with the memory 504, is capable of or configured to facilitate tuning a scan radio to a channel defined within a first frequency band, transmitting, from the scan radio to a serving radio, a first signal indicating the scan radio is operating on the channel, receiving, by the scan radio, a second signal from the serving radio indicating the serving radio is operating on a second frequency band of the channel, and disabling, by a hardware module associated with the scan radio and the serving radio, a transmission capability of the scan radio on the second frequency band.

The memory 504 is capable of, configured to, or operable to store and communicate instructions and data to and from the processor 502.

The user interface 508 may be any device that allows a user to interact with the computing device 500, such as a microphone, dials, buttons, et cetera. In aspects, the user interface 508 may be integrated with the display component 506 to present a touchscreen.

The radio 512 includes at least one radio frequency transmitter and at least one radio frequency receiver, which may be combined into one or more transceivers. The transmitter(s) and receiver(s) may be coupled to one or more antennas. In some aspects, the processor 502, the memory 504, and the radio 512 may collectively facilitate the wireless communication of the computing device 500 with other wireless communication devices over multiple frequency bands (such as 2.4 GHz, 5 GHz, or 6 GHz).

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (R.O.M.), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (I.S.A.) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (P.L.A.) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A method of auto-pairing devices to establish wireless communication between the devices, the method comprising: detecting a first device is docked and communicatively coupled to a docking station; determining the first device is a two-way radio docked to the docking station from device information associated with the two-way radio; detecting a second device is docked and communicatively coupled to the docking station; transmitting a second device information associated with the second device to the two-way radio; and facilitating establishment of a wireless communication connection between the two-way radio and the second device. Thus, the illustrative embodiment provides technological improvements over conventional techniques by implementing an auto-pairing process for devices docked on a docking station, thereby performing more efficient techniques for establishing wireless connectivity between devices.

Clause 2. The method of clause 1, determining the first device is the two-way radio comprises: identifying a MAC address of the headset within the device information; and verifying the MAC address indicates that the first device is a type of two-way radio.

Clause 3. The method of clause 1, or 2, wherein the wireless communication connection is a Bluetooth connection.

Clause 4. The method of clause 1, 2 or 3, the second device is a headset.

Clause 5. The method of clause 1, 2, 3, or 4, wherein the two-way radio includes a dongle communicatively coupled to the two-way radio and configured to provide Bluetooth functionality for the two-way radio.

Clause 6. The method of clause 1, 2, 3, 4, or 5, wherein the second device information associated with the two-way radio is provided by the dongle.

Clause 7. The method of clause 1, 2, 3, 4, 5, or 6, further comprising: detecting a third device docked and communicatively coupled to the docking station; receiving a third device information associated with the third device; transmitting the third device information to the two-way radio; and facilitating a second wireless communication connection between the two-way radio and the third device.

Clause 8. The method of clause 1, 2, 3, 4, 5, 6, or 7, wherein the second wireless communication connection is a Bluetooth low energy connection.

Clause 9. The method of clause 1, 2, 3, 4, 5, 6, 7, or 8, wherein the third device is a push-to-talk (PTT) device.

Clause 10. The method of clause 1, 2, 3, 4, 5, 6, 7, 8, or 9, further comprising: determining, prior to establishing the wireless communication connection, that the headset and the two-way radio have not already established a previous wireless communication connection.

Clause 11. The method of clause 1, 2, 3, 4, 5, 6, 7, 8, 9, or 10 wherein the docking station charges batteries associated with the two-way radio and second device, respectively.

Clause 12. A docking station comprising: one or more memories that store processor-executable code; and one or more processors coupled with the one or more memories and individually or collectively configured to, in association with executing the code, cause the docking station to: detect a first device is docked and communicatively coupled to a docking station; determine the first device is a two-way radio docked to the docking station from device information associated with the headset; detect a second device is docked and communicatively coupled to the docking station; transmit a second device information associated with the second device to the two-way radio; and facilitate establishment of a wireless communication connection between the two-way radio and the second device. Thus, the illustrative embodiment provides technological improvements over conventional techniques by implementing an auto-pairing process for devices docked on a docking station, thereby performing more efficient techniques for establishing wireless connectivity between devices.

Clause 13. The docking station of clause 12, wherein the processor-executable code further causes the docking station to: identify a MAC address of the headset within the device information; and verify the MAC address indicates that the first device is a type of two-way radio.

Clause 14. The docking station of clause 10, or 11, wherein the wireless communication connection is a Bluetooth connection.

Clause 15. The docking station of clause 12, 13, or 14 wherein the second device is a headset.

Clause 16. The docking station of clause 12, 13, 14, or 15, wherein the processor-executable code further causes the docking station to: detect a third device docked and communicatively coupled to the docking station; receive a third device information associated with the third device; transmit the third device information to the headset; and facilitate a second wireless communication connection between the two-way radio and the third device.

Clause 17. The docking station of clause 12, 13, 14, 15, or 16, wherein the second wireless communication connection is a Bluetooth low energy connection.

Clause 18. The docking station of clause 12, 13, 14, 15, 16, or 17, wherein the third device is a push-to-talk (PTT) device.

Clause 19. One or more computer storage media storing computer-useable instructions that, when executed by one or more computing devices, cause the one or more computing devices to perform operations comprising: transmitting device information associated with a two-way radio to a docking station, wherein the two-way radio is docked to the docking station; receiving, from the docking station, second device information associated with a second device docked to the docking station; and establishing a wireless communication connection with the second device using the second device information and communication coupling of the docking station. Thus, the illustrative embodiment provides technological improvements over conventional techniques by implementing an auto-pairing process for devices docked on a docking station, thereby performing more efficient techniques for establishing wireless connectivity between devices.

Clause 20. The one or more computer storage media of clause 19, the operations further comprising: receiving, from the docking station, third device information associated with a third device docked to the docking station; and establishing a wireless communication connection with the third device using the third device information and communication coupling of the docking station.

What is claimed is:

1. A method of auto-pairing devices to establish wireless communication between the devices, the method comprising:

detecting, by a docking station, a first device is docked and communicatively coupled to the docking station;

determining, by the docking station, the first device is a two-way radio docked to the docking station using device information associated with the two-way radio;

detecting, by the docking station, a second device is docked and communicatively coupled to the docking station;

in response to the determining, by the docking station, the first device is a two-way radio, transmitting, by the docking station, a second device information associated with the second device to the two-way radio to notify the two-way radio to initiate establishment of a wireless communication connection between the two-way radio and the second device; and facilitating, by the docking station serving as a connection bridge between the two-way radio and the second device, establishment of the wireless communication connection between the two-way radio and the second device;

in response to the receiving a second device information associated with the second device by the two-way radio, initiating, by the two-way radio acting as a primary device, establishment of a wireless communication connection by transmitting and receiving information to and from the second device while the two-way radio and the second device set up the wireless communication connection.

2. The method of claim 1, wherein determining the first device is the two-way radio comprises:

identifying a MAC address of the two-way radio within the device information; and verifying the MAC address indicates that the first device is a type of two-way radio.

3. The method of claim 1, wherein the wireless communication connection is a Bluetooth connection.

4. The method of claim 1, wherein the second device is a headset.

5. The method of claim 1, wherein the two-way radio includes a dongle communicatively coupled to the two-way radio and configured to provide Bluetooth functionality for the two-way radio.

6. The method of claim 5, wherein the second device information is provided to two-way radio via the dongle.

7. The method of claim 1, further comprising: detecting a third device docked and communicatively coupled to the docking station; receiving a third device information associated with the third device; transmitting the third device information to the two-way radio; and facilitating a second wireless communication connection between the two-way radio and the third device.

8. The method of claim 7, wherein the second wireless communication connection is a Bluetooth low energy connection.

9. The method of claim 7, wherein the third device is a push-to-talk (PTT) device.

10. The method of claim 1, further comprising: determining, prior to establishing the wireless communication connection, that the two-way radio and second device have not already established a previous wireless communication connection.

11. The method of claim 1, wherein the docking station charges batteries associated with the two-way radio and second device, respectively.

12. A system comprising a docking station, a first device, and a second device, each of the docking station, the first device, and the second device comprising: one or more processors coupled to one or more memories that store processor-executable code when executed by the one or more processors causes the system to:

detect, by a docking station, a first device is docked and communicatively coupled to a docking station;

determine, by a docking station, the first device is a two-way radio docked to the docking station from device information associated with the two-way radio;

detect, by a docking station, a second device is docked and communicatively coupled to the docking station;

in response to the determining, by the docking station, the first device is a two-way radio, transmit, by a docking station, a second device information associated with the second device to the two-way radio to notify the two-way radio to initiate establishment of a wireless communication connection between the two-way radio and the second device; and facilitate, by the docking station serving as a connection bridge between the two-way radio and the second device, establishment of the wireless communication connection between the two-way radio and the second device;

in response to the receiving a second device information associated with the second device by the two-way radio, the two-way radio acts as a primary device and initiates a connection request with the second device identified in the second device information by transmitting and receiving information to and from the second device while the two-way radio and the second device set up the wireless communication connection;

and discard, by a docking station, the device information if the first device is not a two-way radio.

13. The docking station of claim 12, wherein the processor-executable code determining the first device is the two-way radio causes the docking station to: identify a MAC address of the two-way radio within the device information; and verify the MAC address indicates that the first device is a type of two-way radio.

14. The docking station of claim 12, wherein the wireless communication connection is a Bluetooth connection.

15. The docking station of claim 12, wherein the second device is a headset.

16. The docking station of claim 12, wherein the processor-executable code further causes the docking station to: detect a third device docked and communicatively coupled to the docking station; receive a third device information associated with the third device; transmit the third device information to the two-way radio; and facilitate a second wireless communication connection between the two-way radio and the third device.

17. The docking station of claim 16, wherein the second wireless communication connection is a Bluetooth low energy connection.

18. The docking station of claim 16, wherein the third device is a push-to-talk (PTT) device.

19. A plurality of non-transitory computer-readable computer storage media storing computer-useable instructions that, when executed by a respective plurality of computing devices comprising a docking station, a two-way radio, and a second device, cause each of the respective computing device of the plurality of computing devices to perform operations comprising:

determining, by a docking station, a two-way radio is docked to the docking station;

transmitting, by the two-way radio, device information associated with the two-way radio to a docking station in response to determining the two-way radio is docked to the docking station;

detecting, by the docking station, a second device is docked and communicatively coupled to the docking station;

receiving, from the docking station, second device information associated with the second device docked to the docking station in response to the determining, by a docking station, a two-way radio is docked to the docking station; and in response to the receiving, from the docking station, the second device information, establishing, initiated by the two-way radio acting as a primary device, a wireless communication connection with the second device using the second device information and communication coupling of the docking station by transmitting and receiving information to and from the second device while the two-way radio and the second device set up the wireless communication connection.

20. The one or more non-transitory computer-readable computer storage media of claim 19, the operations further comprising:

receiving, from the docking station, third device information associated with a third device docked to the docking station; and establishing a second wireless communication connection with the third device using the third device information and the communication coupling of the docking station.

* * * * *